(12) United States Patent
He

(10) Patent No.: US 10,643,517 B2
(45) Date of Patent: May 5, 2020

(54) DISPLAY DEVICE AND DISPLAY DRIVING METHOD

(71) Applicant: HKC Corporation Limited, Shenzhen (CN)

(72) Inventor: Huai Liang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/141,332

(22) Filed: Sep. 25, 2018

(65) Prior Publication Data

US 2019/0139479 A1 May 9, 2019

Related U.S. Application Data

(63) Continuation of application No. PCT/CN2018/106197, filed on Sep. 18, 2018.

(30) Foreign Application Priority Data

Nov. 3, 2017 (CN) .......................... 2017 1 1076143

(51) Int. Cl.
| | |
|---|---|
| *G09G 5/00* | (2006.01) |
| *G09G 3/36* | (2006.01) |
| *G09G 3/20* | (2006.01) |
| *G02F 1/13357* | (2006.01) |
| *G09G 3/00* | (2006.01) |

(52) U.S. Cl.
CPC .......... *G09G 3/2003* (2013.01); *G02F 1/1336* (2013.01); *G02F 1/133602* (2013.01); *G09G 3/00* (2013.01); *G09G 3/3607* (2013.01); *G02F 2001/133624* (2013.01); *G09G 2310/0264* (2013.01)

(58) Field of Classification Search
CPC .... G09G 3/36; G09G 5/00; F21V 7/04; G06F 3/038
See application file for complete search history.

(56) References Cited

U.S. PATENT DOCUMENTS

| | | | | |
|---|---|---|---|---|
| 2004/0257592 | A1* | 12/2004 | Lin | H04N 1/1934 358/1.6 |
| 2013/0093656 | A1* | 4/2013 | Wang | G09G 3/3607 345/88 |
| 2017/0018231 | A1* | 1/2017 | Liu | G09G 3/3688 |
| 2017/0192146 | A1* | 7/2017 | Yamada | G02B 6/005 |
| 2017/0260212 | A1* | 9/2017 | Lee | F21V 9/30 |
| 2017/0351144 | A1* | 12/2017 | Ishihara | G02F 1/133 |
| 2019/0025636 | A1* | 1/2019 | Xing | G02F 1/133514 |
| 2019/0292453 | A1* | 9/2019 | Yonemoto | G02B 5/20 |

* cited by examiner

*Primary Examiner* — Pegeman Karimi

(74) *Attorney, Agent, or Firm* — WPAT, PC

(57) ABSTRACT

A display device and a display driving method are provided. The display device includes a backlight module, a display panel disposed on a light emitting surface of the backlight module, at least a blue light source disposed in the backlight module, and a display driving circuit disposed on the display panel. A first blue light wavelength of the blue light source is greater than 440 nm; the display driving circuit stores a blue light gamma curve of the blue light source; the display driving circuit is used to correct the blue light source according to the blue light gamma curve.

3 Claims, 6 Drawing Sheets

DISPLAY DEVICE AND DISPLAY DRIVING METHOD

FIELD OF THE DISCLOSURE

The disclosure relates to a display technical field, and more particularly to a display device and a display driving method.

BACKGROUND

Displays are widely applied due to numerous advantages such as thin bodies, energy saving, radiation-free, etc. Most displays available on the market are backlight-type displays, and such a display includes a display device and a backlight module. The working principle of the display device is placing liquid crystal molecules between two parallel substrates, and applying a driving voltage on the two substrates to control rotation directions of the liquid crystal molecules, for refracting rays from the backlight module to generate images.

A thin film transistor-liquid crystal display (TFT-LCD) gradually occupies the dominant position in the display realm at present because of its properties such as low energy consumption, superior image quality and relatively high production yield, etc. Identically, the TFT-LCD includes a display device and a backlight module. The display device includes a color filter (CF) substrate and a thin film transistor (TFT) substrate. The opposite internal sides of the substrates have transparent electrodes. A layer of liquid crystal (LC) molecules are interposed between the two substrates. The display device alters the polarization state of light under the control of the electric field on the orientation of liquid crystal molecules, and achieves the objective of display via blocking or unblocking the optical path through a polarizer.

As the usage of displays is prevalent, users spend more time on the displays, including a mobile phone, a monitor, a laptop, a pad, a TV, even some smart watches, and all of the displays employ a LCD (Liquid crystal display) or an OLED (Organic light emitting diode) as the display element. However, some medical journals and professionals have alarmed the danger of blue light emitted from the display. Eyes would be chronically hurt during the long term irradiation of blue light with short wavelengths from the display, or resulting in blindness in some severe situations. LCDs equipped with blue LED chips as the backlight or OLED blue display elements are necessary to be designed to prevent the harm of blue light on eyes.

SUMMARY

The disclosure provides a display device and a display driving method for reducing the harm of blue light on eyes and improving quality of images.

The objective of the disclosure is achieved via following embodiments.

On one hand, the disclosure discloses a display device, including: a backlight module, a display panel disposed on a light emitting surface of the backlight module, at least one blue light source disposed in the backlight module, and a display driving circuit disposed on the display panel.

A first blue light wavelength of the blue light source is greater than 440 nm and less than or equal to 460 nm.

The display driving circuit stores a blue light gamma curve of the blue light source.

The display driving circuit is configured (i.e., structured and arranged) to correct the blue light source according to the blue light gamma curve.

The display driving circuit further stores red light and green light gamma curves based on the blue light source.

On the other hand, the disclosure discloses a display device, including: a backlight module, a display panel disposed on a light emitting surface of the backlight module, at least one blue light source disposed in the backlight module, and a display driving circuit disposed on the display panel.

A first blue light wavelength of the blue light source is greater than 440 nm.

The display driving circuit stores a blue light gamma curve of the blue light source.

The display driving circuit corrects the blue light source according to the blue light gamma curve.

Furthermore, a range of the first blue light wavelength is greater than 440 nm and less than or equal to 480 nm. The wavelength of light adopting blue light with short wavelengths generally is 440 nm. The selected wavelength of blue light should be no less than 440 nm for reducing the intensity of blue light with the same display effect.

Furthermore, the first blue light wavelength is 460 nm. The color will turn to cyan when the optical wavelength exceeds 480 nm. Therefore, the blue light source is not recommended to approach the upper limit of 480 nm, otherwise, as soon as a display error occurs, the display would turn to cyan, resulting in slumping display quality. Therefore, 460 nm is a proper choice to prevent the shift towards cyan and distinguish from the blue light with short wavelengths, and the image quality can be enhanced visibly.

Furthermore, a range of the first blue light wavelength is greater than or equal to 450 nm, and simultaneously less than or equal to 470 nm.

Furthermore, the display driving circuit further includes red light and green light gamma curves based on the blue light source. The red light, the green light and the blue light are corrected based on the white light. As long as the white light is corrected precisely, the corresponding gamma curves of red light, green light and blue light would be curves fairly in accordance with the real display effect, further reducing the situation of yellowish images.

According to another aspect of the disclosure, the disclosure further discloses a display driving method of a display device. The display driving method includes: providing a backlight module, disposing at least one blue light source in the backlight module, and correcting the blue light source according to a blue light gamma curve.

A blue light wavelength of the blue light source is greater than 440 nm.

Furthermore, a range of the first blue light wavelength is greater than 440 nm and less than or equal to 480 nm. The wavelength of light adopting blue light with short wavelengths generally is 440 nm. The selected wavelength of blue light should be no less than 440 nm for reducing the intensity of blue light with the same display effect.

Furthermore, the display driving method further includes: correcting a white light gamma curve based on the blue light source, and storing the blue light gamma curve, a red light gamma curve and a green light gamma curve corresponding to the white light gamma curve into a display driving circuit. The red light, the green light and the blue light are corrected based on the white light. As long as the white light is corrected precisely, the corresponding gamma curves of red light, green light and blue light would be curves fairly in accordance with the real display effect, further reducing the situation of yellowish images.

Furthermore, a gamma value of the white light gamma curve is 2.2. In Windows systems, the gamma value of white light is 2.2. As most users get used to the display effect of Window systems, the gamma value can be determined according to the reference to meet the bias of users to the utmost.

Furthermore, steps of using the blue light gamma curve of the blue light source to perform a display correction include: selecting the first blue light wavelength of the blue light source, calculating relations of light intensity versus wavelength of the first blue light wavelength and a second blue light wavelength of 440 nm, calculating a corresponding multiple relation of light intensity versus the first blue light wavelength at respective blue light intensities of a light source with the second blue light wavelength, based on a ratio relation between the first blue light wavelength and the second blue light wavelength, recording a relation of the second blue light wavelength and corresponding grayscales of the display device, to obtain the blue light gamma curve, correcting a white light gamma curve based on the blue light source, and storing the blue light gamma curve, a red light gamma curve and a green light gamma curve corresponding to the white light gamma curve into a display driving circuit.

The algorithm of correcting colors of a display device according to the ability of eyes recognizing differences in colors can automatically correct the color shift of the display device when blue light of the display device are blue light with long wavelengths, preventing the problem of yellowish images of the display device. Blue light can be various to an eye in different brightness. If the intensity of the blue light is stronger with the same wavelength, the hue will be blue shifted, and the property of eyes can be utilized to freeze the hue through adjusting the intensity of blue light. Therefore, the applicant uses the blue light source to reduce the light intensity of the blue light for the purpose of decreasing the harm of the blue light on eyes. On the other hand, the display driving circuit stores the blue light gamma curve of the blue light source; the display driving circuit corrects the blue light source according to the blue light gamma curve, and controls the intensity of blue light of the display via the voltage or current based on an algorithm for correction of the hue perception of the display, as a result, even if the intensity is reduced, blue light perception will not be slumped in eyes, and the image quality is almost unaffected.

Figure 1:
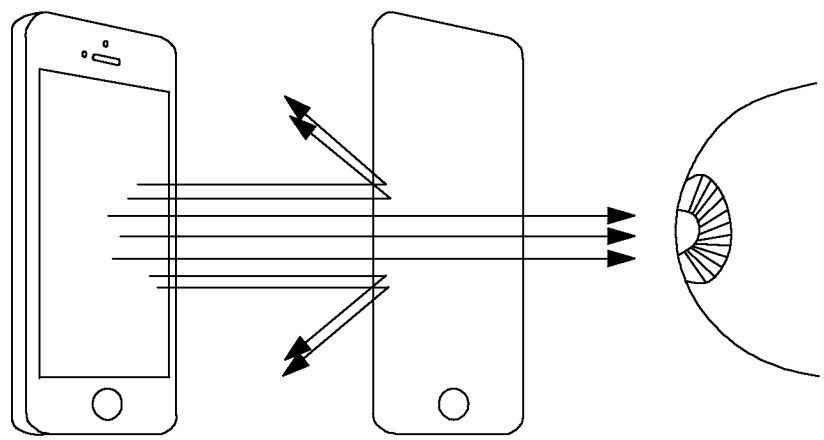
FIG. 1 is a principal schematic view of reducing blue light through a highly transmissible thin film of an embodiment of the disclosure.

Where label 10 is a backlight module; 20 is a display panel, 30 is a blue light source, and 40 is a display driving circuit.

DETAILED DESCRIPTION OF PREFERRED EMBODIMENTS

Specific structures and functional details disclosed here are only representative, and the purpose thereof is to illustrate exemplary embodiments of the disclosure. But the disclosure can be implemented in many substitutional forms, and the described embodiments should not be interpreted as limitations of the disclosure.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings, aiming at illustrating the disclosure and simplifying the description rather than indicating or implying the device or element must have a certain orientation and be structured or operated in the certain orientation, and therefore cannot be regarded as limitation with respect to the disclosure. Moreover, terms "first" and "second" are merely for the purpose of illustration and cannot be regarded as indicating or implying the relative importance or implicitly indicating the number of the technical features. Therefore, features defined with "first", "second" can obviously or impliedly include one or more features. In the description of the disclosure, unless otherwise indicated, the meaning of "multiple" is two or more than two. In addition, the term "include" and any variations thereof are meant to cover a non-exclusive inclusion.

In the description of the disclosure, unless otherwise clearly stated and limited, terms "mounted", "connected with" and "connected to" should be understood broadly, for instance, as a fixed connection, a detachable connection or an integral connection; or a mechanical connection, an electrical connection; a direct connection, an indirect connection through an intermediary, or an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "include" and/or "contain" define the existence of described features, integers, steps, operations, elements and/or components, but do not exclude the existence or addition of one or more other features, integers, steps, operations, elements, components and/or combinations thereof.

Regarding Gamma Correction:

The brightness of the display device is not directly proportional to the input voltage signal, and a distortion is present. If a black-and-white image signal is input, the distortion will make the intermediate section of the image displayed dark, so that the image will be darker than the original scene; if a color image signal is input, the distortion will cause the image to be dim, as well as the color shift of the displayed images. Gamma is a parameter to measure the distortion, representing a nonlinear relationship between the luminance output and the input voltage signal. A liquid crystal display device can obtain a relatively high display quality after the gamma correction of a new product.

Main steps of the gamma correction of the display device are: first, obtaining a standard gamma curve through measuring the white state brightness and the black state brightness of the display device for determining the standard brightness value of the grayscale; second, measuring a brightness value of grayscale of the display device, comparing the measured brightness value of grayscale and the standard brightness value of grayscale; last, if the measured brightness value of grayscale is different from the standard brightness value of grayscale, modifying the brightness value of grayscale through adjusting the voltage of a driving IC register, then re-measuring the brightness value for comparison, repeating the steps of measurement and comparison until the measured brightness value of grayscale approaches the standard brightness value of grayscale.

There are several primary methods of measuring brightness values of grayscale of a display device as follows.

Method 1: all the grayscales are displayed respectively, such as from 0 grayscale to 255 grayscale, then brightness of each of the grayscales is measured.

Method 2: Grayscales are picked up from 0 grayscale to 255 grayscale evenly, such as extracting 64 grayscales, then brightness of each of the grayscales is measured.

Method 3: grayscales corresponding to the voltage determined through the display driving circuit, such as 5 groups of grayscales or 7 groups of grayscales.

Regarding Bezold-Brücke Effect:

generally, visual organs of human can receive and distinguish various colors in the visible spectrum under the condition of certain brightness, including distinguishing similar colors. With regard to light with certain wavelengths, the color and the wavelength are not perfectly corresponding. In other words, with the same wavelength, the color will change in different conditions. The reason is numerous colors are sensitive to the intensity of light, and the color will change as light intensity changes.

The disclosure will be further illustrated with reference to exemplary embodiments and the accompanied drawings.

Referring to FIG. 1, the embodiment discloses a technical solution to reduce the influence of blue light through a highly transmissible thin film. Specifically, a highly transmissible thin film capable of filtering blue light is disposed in front of the display screen of the display device for eliminating the harm of blue light to eyes via filtering blue light with certain wavelengths.

Figure 2:
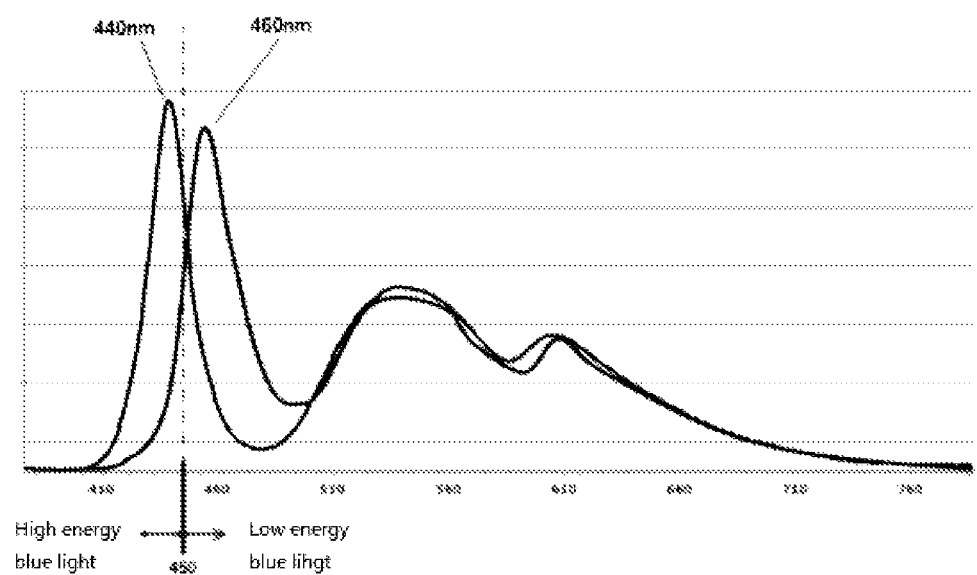
FIG. 2 is a principal schematic view of reducing blue light with optimized light sources of an embodiment of the disclosure.

Referring to FIG. 2, the embodiment discloses a technical solution to reduce blue light with optimized light sources. The LED backlight is taken as an example, the spectrum of the LCD backlight source is adjusted, especially shifting the wavelength of blue light from LED chips towards longer wavelengths, resulting in reducing the energy of blue light.

When the blue light filter thin film technique or the wavelength adjustment technique is adopted to reduce the harm of blue light on eyes, the entire display image will be yellowish due to the lack of blue light, leading to severe distortion of images. Therefore, in the blue light resist technology, how to achieve the reduction of blue light energy and prevent colors from distortion is a pretty critical issue, and embodiments disclosed below can overcome the problem.

Figure 3:
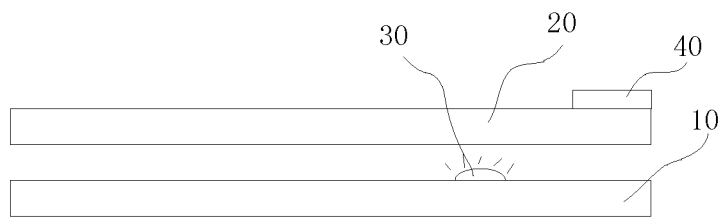
FIG. 3 is a principal schematic view of a display device according to an embodiment of the disclosure.

Referring to FIG. 3, the display device disclosed in the embodiment includes a backlight module 10, a display panel 20 disposed on a light emitting surface of the backlight module 10, a blue light source 30 disposed in the backlight module 10, and a display driving circuit 40 disposed on the display panel 20.

A first blue light wavelength of the blue light source 30 is greater than 440 nm.

The display driving circuit 40 includes a blue light gamma curve of the blue light source 30.

The display driving circuit corrects the blue light source according to the blue light gamma curve.

The embodiment is based on the phenomenon of color shift towards shorter wavelengths of blue light. The shift would be recorded in the algorithm, and the chip is employed to control the brightness of blue pixels of the display panel 20 for the result of constant colors in an image.

As another embodiment of the disclosure, the display device disclosed in the embodiment includes the backlight module 10, the display panel 20 disposed on a light emitting surface of the backlight module 10, the blue light source 30 disposed in the backlight module 10, and a display driving circuit 40 disposed on the display panel 20.

A first blue light wavelength of the blue light source 30 is greater than 440 nm. The display driving circuit 40 includes a blue light gamma curve of the blue light source 30.

A range of the first blue light wavelength is greater than 440 nm and less than or equal to 480 nm. Optionally, the first blue light wavelength is 460 nm.

The wavelength of light adopting blue light with short wavelengths generally is 440 nm. The selected wavelength of blue light should be no less than 440 nm for reducing the intensity of blue light with the same display effect. The color will be shifted to cyan when the optical wavelength exceeds 480 nm. Therefore, the blue light source 30 is not recommended to approach the upper limit of 480 nm, otherwise, as soon as a display error occurs, the display would turn to cyan, resulting in slumping display quality. Therefore, 460 nm is a proper choice to prevent the color shift towards cyan and distinguish from the blue light with short wavelengths, and the image quality can be enhanced visibly.

Figure 4:
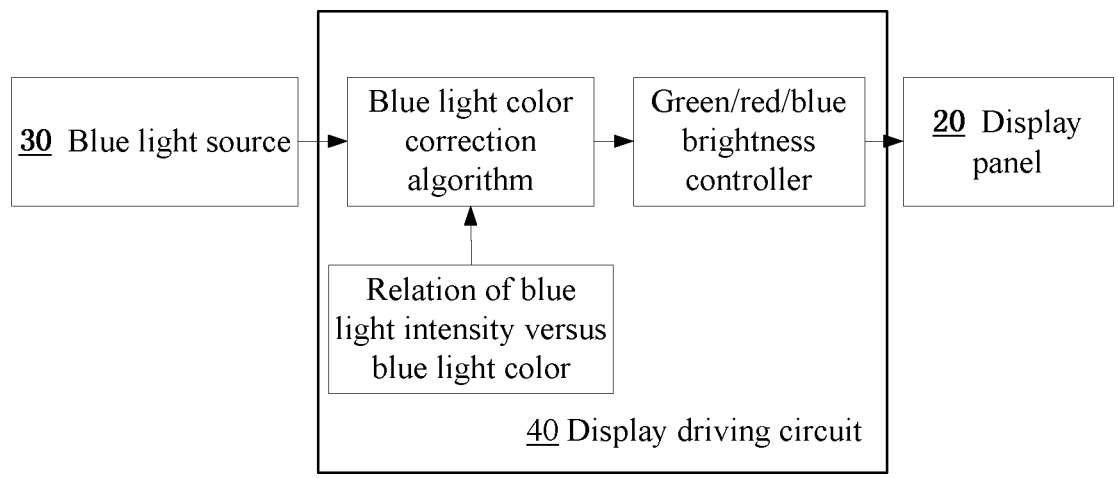
FIG. 4 is a principal schematic view of a display device according to another embodiment of the disclosure.

The display device disclosed in embodiments shown as FIGS. 3 and 4 includes the backlight module 10, the display panel 20 disposed on a light emitting surface of the backlight module 10, the blue light source 30 disposed in the backlight module 10, and a display driving circuit 40 disposed on the display panel 20.

The first blue light wavelength of the blue light source 30 is greater than 440 nm. The display driving circuit 40 includes a blue light gamma curve of the blue light source 30. The range of the first blue light wavelength is greater than 440 nm and less than or equal to 480 nm. Optionally, the first blue light wavelength is greater than 440 nm and less than or equal to 460 nm. Optionally, the range of the first blue light wavelength is greater than or equal to 450 nm, and less than or equal to 470 nm. Moreover, the first blue light wavelength can be 460 nm.

The display driving circuit 40 includes the red light and the green light gamma curves based on the blue light source 30.

The display driving circuit 40 is integrated with an algorithm to correct blue light. The blue light gamma curve is obtained after the comprehensive analysis of the relation of the intensity and hue of blue light, and data collected in the blue light source with short wavelengths/the display, correspondingly, after the blue light correction, red light and green light should be corrected accordingly to obtain the red light and the green light gamma curves. The dependency of correction still is the red, green and blue light can be synthesized to be standard white light when the brightness is identical. The green/red/blue brightness controller governs the brightness of three primary colors in the display panel 20 to enhance the image quality.

In some embodiments, the display panel 20 can be a liquid crystal panel, a plasma panel, an OLED panel, a QLED (Quantum Dot Light emitting diode) panel, etc.

The embodiment makes a further improvement based on the aforementioned embodiment to correct red light, green light and blue light according to white light. As long as the white light is corrected precisely, the corresponding gamma curves of red light, green light and blue light would be curves fairly in accordance with the real display effect, further reducing the situation of yellowish images.

Optionally, the gamma value of the white light gamma curve is 2.2. In Windows systems, the gamma value of white light is 2.2. As most users get used to the display effect of Window systems, the gamma value can be determined according to the reference to meet the bias of users to the utmost.

Figure 5:
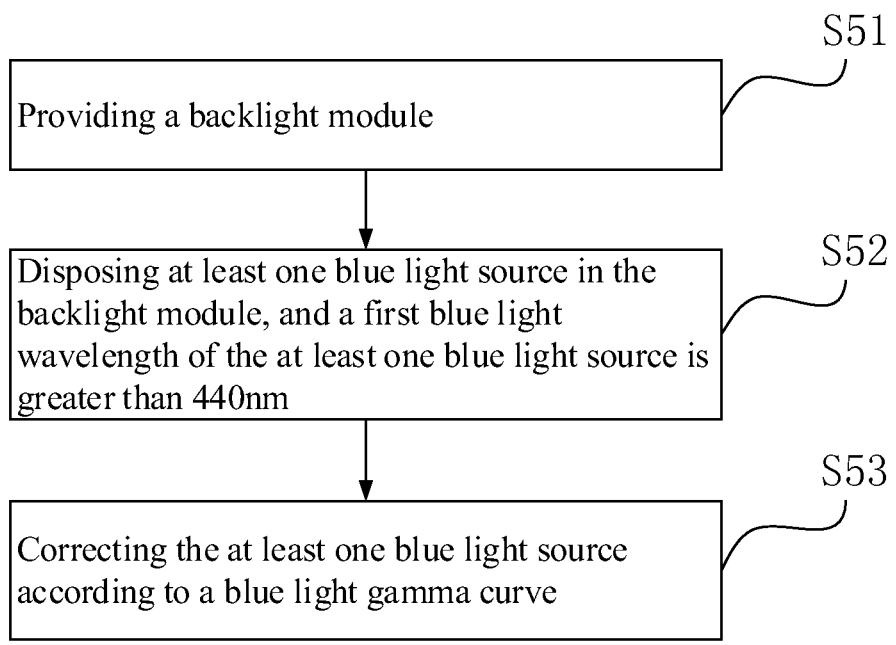
FIG. 5 is a schematic view of a display driving method of a display device of an embodiment of the disclosure.

According to another aspect of the disclosure, the embodiment shown in FIG. 5 discloses a display driving method of a display device. The display driving method includes following steps.

S51, a backlight module is provided.

S52, at least one blue light source is disposed in the backlight module. The first blue light wavelength of the blue light source is greater than 440 nm.

S53, the blue light source is corrected according to the blue light gamma curve.

The algorithm of correcting colors of a display device according to the ability of eyes recognizing differences in colors can automatically correct the color shift of the display device when blue light of the display device are blue light with long wavelengths, preventing the problem of yellowish images of the display device. Blue light can be various to an eye in different brightness. If the intensity of the blue light is stronger with the same wavelength, the hue will be blue shifted, and we can utilize the property of eyes to freeze the hue through adjusting the intensity of blue light. Therefore, the applicant uses the blue light source to reduce the light intensity of the blue light for the purpose of decreasing the harm of the blue light on eyes. On the other hand, the display driving circuit stores the blue light gamma curve of the blue light source; the intensity of blue light of the display is controlled via the voltage or current based on an algorithm for correction of the hue perception of the display, as a result, even if the intensity is reduced, blue light perception will not slump in eyes, and the image quality is almost unaffected.

Figure 6:
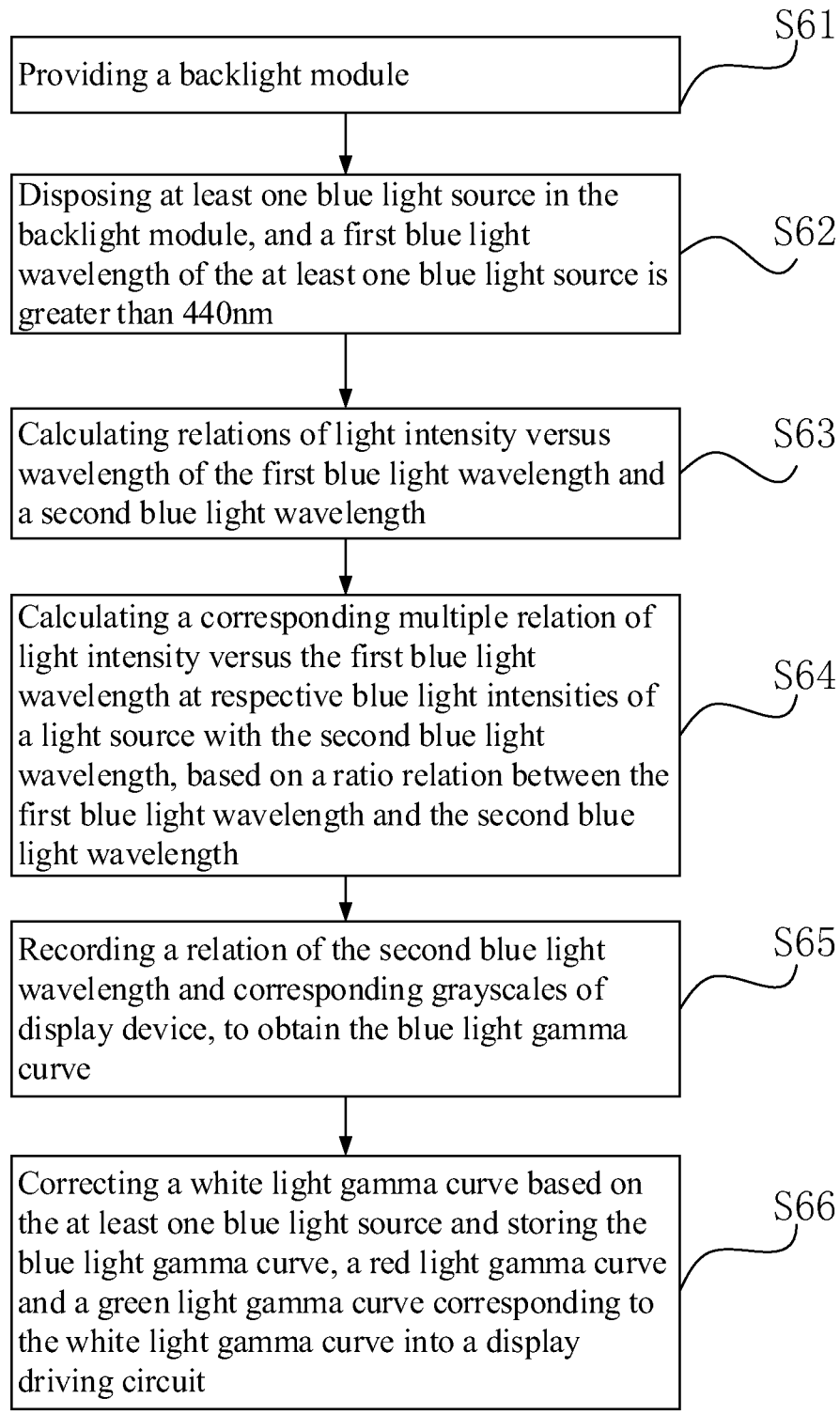
FIG. 6 is a schematic view of a display driving method of a display device of another embodiment of the disclosure.

The embodiment shown in FIG. 6 discloses a display driving method includes following steps.

S61, a backlight module is provided.

S62, at least one blue light source is disposed in the backlight module. The first blue light wavelength of the blue light source is greater than 440 nm.

S63, relations of light intensity versus wavelength of the first blue light wavelength and a second blue light wavelength are calculated.

S64, based on a ratio relation between the first blue light wavelength and the second blue light wavelength, a corresponding multiple relation of light intensity versus the first blue light wavelength at respective blue light intensities of a light source with the second blue light wavelength is calculated.

S65, a relation of the second blue light wavelength and corresponding grayscales of display device is recorded to obtain the blue light gamma curve.

S66, based on the blue light source, a white light gamma curve is corrected, and the blue light gamma curve, a red light gamma curve and a green light gamma curve corresponding to the white light gamma curve are stored in a display driving circuit.

The first blue light wavelength of the blue light source is greater than 440 nm. The display driving circuit stores a blue light gamma curve of the blue light source. The range of the first blue light wavelength is greater than 440 nm and less than or equal to 480 nm. Optionally, the first blue light wavelength is greater than 440 nm and less than or equal to 460 nm. Optionally, the range of the first blue light wavelength is greater than or equal to 450 nm and less than or equal to 470 nm. Moreover, the first blue light wavelength can be 460 nm.

The display driving circuit is integrated with an algorithm to correct blue light. The blue light gamma curve is obtained after the comprehensive analysis of the relation of the intensity and hue of blue light, and data collected in the blue light source with short wavelengths/the display, correspondingly, after the blue light correction, red light and green light should be corrected accordingly to obtain the red light and the green light gamma curves. The dependency of correction is still the red, green and blue light can be synthesized to be standard white light when the brightness is identical. The green/red/blue brightness controller governs the brightness of three primary colors in the display panel to enhance the image quality.

The embodiment makes a further improvement based on the aforementioned embodiment. The wavelength of light adopting blue light with short wavelengths generally is 440 nm. The selected wavelength of blue light should be no less than 440 nm for reducing the intensity of blue light with the same display effect. The color will turn to cyan when the optical wavelength exceeds 480 nm. Therefore, the blue light source is not recommended to approach the upper limit of 480 nm, otherwise, as soon as a display error occurs, the display would turn to cyan, resulting in slumping display quality. Therefore, 460 nm is a proper choice to prevent the shift towards cyan and distinguish from the blue light with short wavelengths, and the image quality can be enhanced visibly. Moreover, the red light, the green light and the blue light are corrected based on the white light. As long as the white light is corrected precisely, the corresponding gamma curves of red light, green light and blue light would be curves fairly in accordance with the real display effect, further reducing the situation of yellowish images.

Optionally, the gamma value of the white light gamma curve is 2.2. In Windows systems, the gamma value of white light is 2.2. As most users get used to the display effect of Window systems, the gamma value can be determined according to the reference to meet the bias of users to the utmost.

The LED is the backlight, and the first blue light wavelength is 460 nm. An example is taken accordingly for explanation.

Referring to FIG. 2, a spectrum is designed first. A first blue light wavelength $\lambda b$ thereof is greater than a second blue light wavelength $\lambda bo$.

Figure 7:
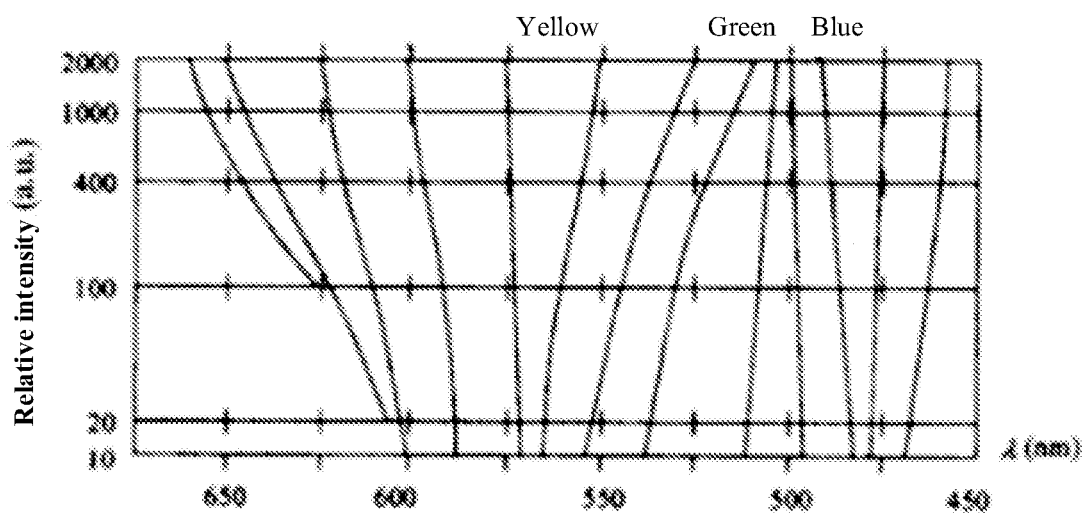
FIG. 7 is a principal schematic view of Bezold-Brücke effect.
Figure 8:
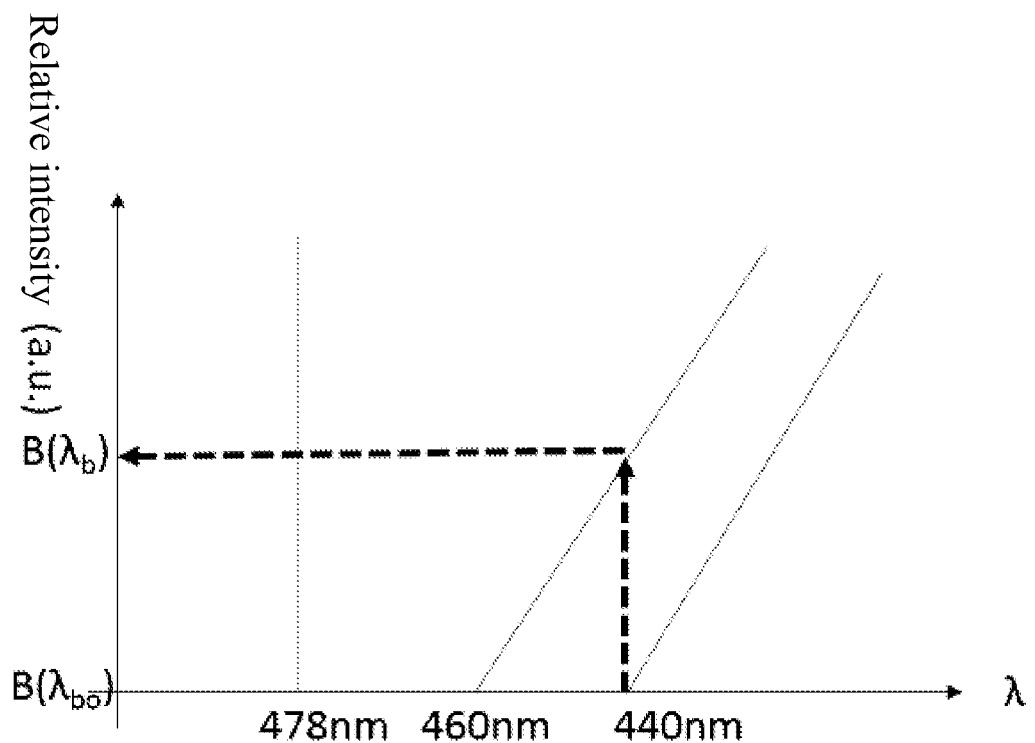
FIG. 8 is a schematic view of relative intensities of blue light with respect to wavelengths.

Referring to FIGS. 7 and 8, the relations of light intensity versus the first blue light wavelength at wavelengths of 460 nm and 440 nm utilizing the Bezold-Brücke effect. And according to the ratio relation of $B(\lambda b)/B(\lambda bo)$, a corresponding multiple relation of light intensity versus the long blue light wavelength at respective blue light intensities of a light source with the original blue light wavelength is calculated, and FIG. 9 is drawn accordingly.

Figure 9:
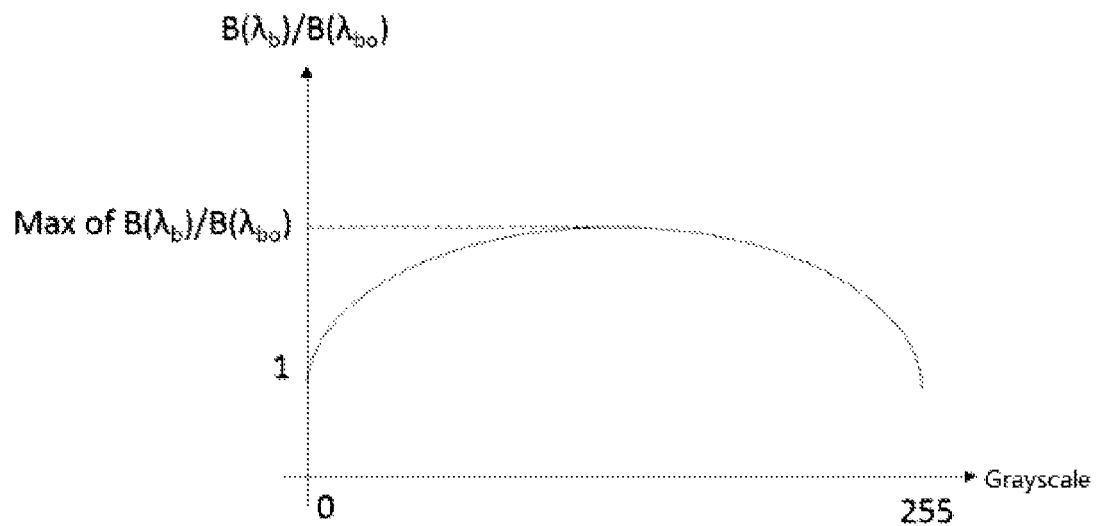
FIG. 9 is a schematic view of a relation of ratios of intensities corresponding to those of a first blue light wavelength to a second blue light wavelength and grayscales.
Figure 10:
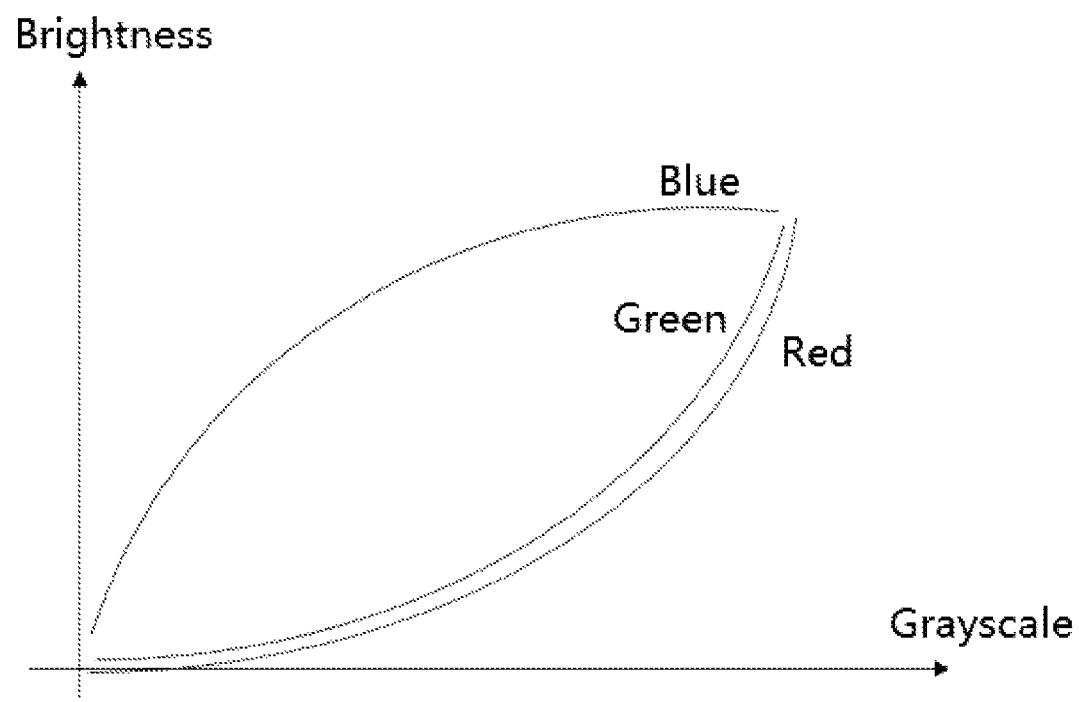
FIG. 10 is a schematic view of gamma curves of red light, green light and blue light.

According to FIG. 9, the relation of the brightness of the first blue light wavelength λb and each grayscale of the display can be obtained, as shown in FIG. 10. The gamma curve of white light is corrected taking advantage of the gamma curves of red light and green light. The gamma value of the white light of the display is generally adjusted to be 2.2.

The achieved three gamma curves of red, green and blue light are disposed in a gamma control circuit of the display to correct the display when the wavelength of blue light of the LED backlight module is large for solving the problem of yellowish images.

In the embodiments above, the display device includes a liquid crystal panel, a plasma panel, an OLED panel, a QLED panel and the like. Taking the liquid crystal panel as an example, the liquid crystal panel includes an array substrate and a color filter (CF) substrate. The array substrate and the color filter substrate are disposed opposite. The liquid crystal and photo spacer (PS) are disposed between the array substrate and the color filter substrate. The array substrate is disposed with a thin film transistor (TFT). The color filter substrate is disposed with a color filter layer.

In the embodiments above, the color filter substrate can include the TFT array. The color film and the TFT array can be formed on the same substrate. The array substrate can include the color filter layer.

In the embodiments above, the display panel of the disclosure can be a curved panel.

In the embodiments according to the disclosure, the disclosed system, device and method can be achieved in other forms. For instance, the device described in the embodiments above merely is exemplary, for example, the division is nothing but a logically functional division, and other divisions can be applied in practice. And multiple elements or modules can be combined or integrated in another system, or some feature can be omitted, or skipped in execution. In addition, the mutual connection of coupling, immediately coupling or communicating in display or discussion can be indirect coupling or communicating connection through some port, device or element, electrically, mechanically or in other forms.

The parts illustrated separately can be physically discrete or not. The shown parts can be physical parts or not, located at one position, or distributed on numerous paths. Some or all of the units can be selected to chase the objective of the embodiments according to the practical requirement.

The final declaration is the embodiments above are merely for illustrating embodiments of the disclosure rather than any limitation; even though the disclosure is explained in detail with reference to the aforementioned embodiments, a person skilled in the art can understand the previously described embodiments can be amended, or some technical features therein can be replaced; the amendment or replacement will not result in the essence excluded from the spirit and scope of the disclosure.

What is claimed is:

1. A display driving method of a display device, comprising:
   providing a backlight module;
   disposing at least one blue light source in the backlight module, wherein a first blue light wavelength of the at least one blue light source is greater than 440 nm;
   correcting the at least one blue light source according to a blue light gamma curve;
   wherein a range of the first blue light wavelength is greater than 440 nm and less than or equal to 480 nm;
   wherein the step of correcting the at least one blue light source according to a blue light gamma curve comprises:
   selecting the first blue light wavelength of the at least one blue light source;
   calculating relations of light intensity versus wavelength of the first blue light wavelength and a second blue light wavelength of 440 nm;
   calculating a corresponding multiple relation of light intensity versus the first blue light wavelength at respective blue light intensities of a light source with the second blue light wavelength, based on a ratio relation between the first blue light wavelength and the second blue light wavelength;
   recording a relation of the second blue light wavelength and corresponding grayscales of display device, to obtain the blue light gamma curve.

2. The display driving method of a display device according to claim 1, further comprising:
   correcting a white light gamma curve based on the at least one blue light source, and storing the blue light gamma curve, a red light gamma curve and a green light gamma curve corresponding to the white light gamma curve into a display driving circuit.

3. The display driving method of a display device according to claim 2, wherein a gamma value of the white light gamma curve is 2.2.

* * * * *